(No Model.)

G. G. GREENOUGH.
APPARATUS FOR RELOADING CARTRIDGE SHELLS.

No. 351,861. Patented Nov. 2, 1886.

Witnesses:
John Wilson
J. Wait

Inventor:
G. G. Greenough
by J. J. Greenough
Att'y

United States Patent Office.

GEORGE G. GREENOUGH, OF BOSTON, MASSACHUSETTS.

APPARATUS FOR RELOADING CARTRIDGE-SHELLS.

SPECIFICATION forming part of Letters Patent No. 351,861, dated November 2, 1886.

Application filed June 10, 1885. Serial No. 168,246. (No model.)

*To all whom it may concern:*

Be it known that I, GEORGE G. GREENOUGH, a citizen of the United States, now residing in Boston, in the State of Massachusetts, have invented certain new and useful Improvements in Apparatus for Reloading Shells for Fire-Arms, of which the following is a description.

The purpose of my device is to furnish a portable apparatus for readily and quickly reloading shells in the field or elsewhere at the place where they are used, and with safety to the manipulator. I attain these objects by the mechanism illustrated in the accompanying drawings, in which—

Figure 1:
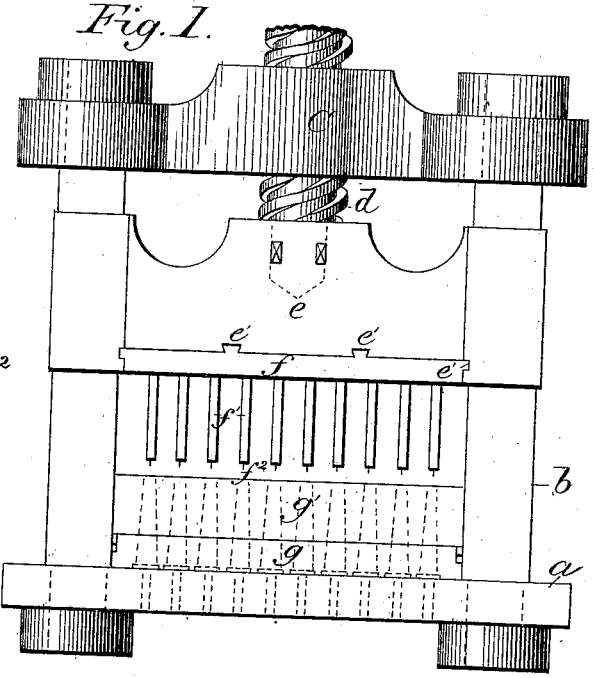
Figure 2:
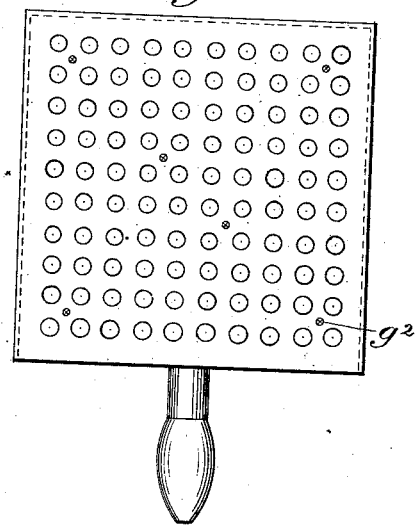
Figure 3:
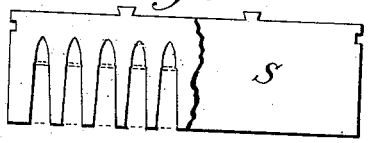
Figure 4:
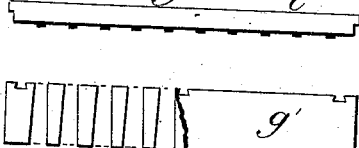
Figure 7:
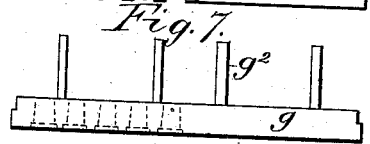
Figure 5:
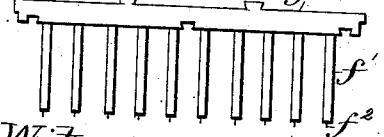
Figure 6:
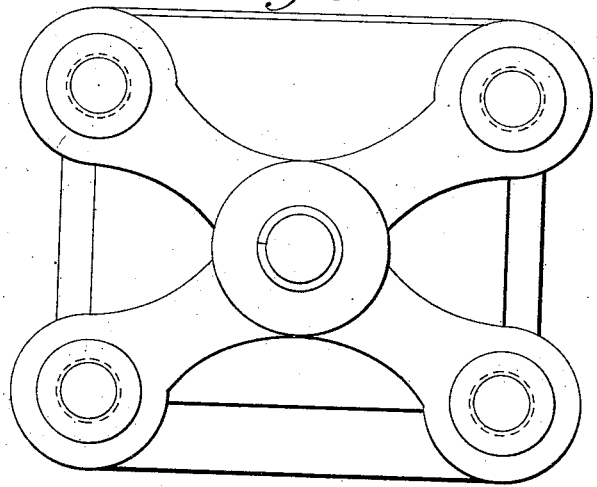

Figure 1 is a front elevation of the press. Fig. 2 is a plan of the recharger-block. Fig. 3 is a detail of the crimping-block $s$, one-half in section; Fig. 4, an edge view of the capping-plate $l$. Fig. 5 is an edge view of plate $f$, for removing the discharged caps from the shells. Fig. 6 is a plan of the press; Fig. 7, resizer-blocks separated.

The same letters of reference are used in all the figures to designate like parts.

The apparatus consists of a press for resizing, decapping, recapping, and reloading shells, with a resizer for re-forming the shells, and punches for removing the discharged caps, a capper, and crimping-block for affixing the bullets. The press is composed of a bed-plate, $a$, from the four corners of which standards $b$ project up perpendicularly to a cap-piece, $c$, which can be made removable for convenience in packing. A press-screw, $d$, passes down through a nut at the center of cap $c$, its lower end being attached to a follower, $e$, with a swivel-joint, so as to raise and lower said follower $e$ as it is screwed up or down. There are grooves in the face of the follower at $e'$, into which ribs on the punch-plate, capper-plate, and crimper-block fit when slid into place under the follower. The punch-plate $f$ is shown connected with the follower $e$ in Fig. 1 and separated at Fig. 5. It is a flat plate, from the under side of which a series of punches, $f'$, project downward, as many in number as the shells to be operated upon at one time in the press—say one hundred, more or less. These punches are of a size to readily enter the shells when in position, and from their lower ends small pins $f^2$ project, that pass down through the center hole in the base of the shell and discharge the cap therefrom while the shell is held accurately. The resizer, Fig. 7, is composed of two thick blocks, $g\ g'$. These blocks united are as thick as the shells are long, and have holes in them of the proper diameter for resizing the shells, and are arranged as shown in Fig. 2. These holes exactly correspond in the two blocks, which is insured by dowels $g^2$, affixed in the lower block, $g$, that extend up through holes in the block $g'$. These dowels should be long enough to rise above the end of the shells. In using this block $g\ g'$ the shells are pressed into the holes in $g$ from the under side, (these holes being recessed to fit the rim of the base of the shells—see dotted lines, Fig. 1,) project up through the thickness of the block $g'$, which, guided by the dowel-pins $g^2$, is forced down upon the shells that enter the holes therein, and the blocks are slid in upon the bed-plate $a$ of the press. This bed-plate is pierced with holes of a smaller caliber than those of the blocks $g$, but corresponding therewith, one of them being under each of the shells. The punches $f'$ are forced down into the shells by the follower, and the blocks $g\ g'$ are brought together and the shells pressed home and resized, while at the same time the caps are discharged and fall through the holes in the base-plate. By connecting the upper block, $g$, of the resizer with the follower by links or other convenient device it is lifted off from the upper ends of the shells as the follower rises with the punches. The lower block, $g'$, is then drawn out of the press with the shells therein, and the shells discharged from it ready for cleaning and oiling. This former is effected by a shell-washer, and the shells are afterward oiled, when they are ready for reloading. They are then again put into the resizer-block $g'$, standing in a reversed position, and the caps are inserted in the recesses in the bases of the shells. The block $g$ is then put into the press in its reversed position, supported on its dowel-pins, and the punch-plate being removed, and a capping-plate, $l$, Fig. 4, having small elevations or bosses projecting from its under face, being substituted on the follower therefor, the follower is brought down, and the bosses striking the shells in the recesses of the caps affix them.

The shells, still being in the resizer-block, are transferred to a charging apparatus, where they are charged with powder and ball. The block, with the loaded shells, is then replaced in the press and the crimping-block $s$ affixed to the follower. The crimping-block $s$ is of sufficient thickness to have the recesses formed therein deep enough to have the apex of the exact form of the bullet, below which the base is of the size of the holes in the resizer-block $g'$, with an offset at the top of the shell to crimp it in around the bullet to attach them properly together. By bringing down this crimper-block over the bullets and shells they are united with accuracy and firmness. This completes the operation, which in practice may be facilitated by duplicating the resizer-blocks, so as to have the different operations going on simultaneously.

Having thus described my improved apparatus for rapidly and safely reloading shells, what I claim as my invention is—

1. In an apparatus for resizing, recapping, and reloading shells for fire-arms, the combination of a press with a series of adjustable plates provided, respectively, with a series of recesses for resizing the shells, punches $f'\,f^2$, for removing the caps, crimping-dies for crimping the edge of the shells, and bosses for seating the caps in place, substantially as set forth.

2. In combination with a press to co-operate with the same, the resizer-blocks $g\,g'$, formed of two plates removably connected together, and having a series of recesses conforming to the normal size of the shell, whereby a series of discharged shells may be simultaneously resized, as set forth.

3. In combination with the press and the resizing-plates carried thereby, the punch-plate $f$, having projecting therefrom a series of punches, $f'$, provided with ejecting-spurs $f^2$, whereby a series of shells may be simultaneously decapped, as set forth.

4. In combination with the press and the carrier-block $g$, for retaining a series of shells, the capping-plate $l$, having a series of bosses on the face thereof in position, when in the press, to act upon and seat the caps in the series of shells held by the carrier-block $g$, as set forth.

5. In combination with a press which co-operates with the same, the shell-carrying section $g$ of the resizing-block and the crimping-block $s$, fitted to the same and having a series of crimping-dies, whereby the shells are crimped around the balls when the shells are loaded, substantially as set forth.

GEORGE G. GREENOUGH.

Witnesses:
J. J. GREENOUGH,
J. P. MUNRO.